Aug. 1, 1961 — C. A. L. RUHL — 2,994,346
CONTROL VALVE

Filed Sept. 2, 1959 — 2 Sheets-Sheet 2

INVENTOR
Charles A. L. Ruhl
BY
ATTORNEYS

United States Patent Office 2,994,346
Patented Aug. 1, 1961

2,994,346
CONTROL VALVE
Charles A. L. Ruhl, Kalamazoo, Mich., assignor to The New York Air Brake Company, a corporation of New Jersey
Filed Sept. 2, 1959, Ser. No. 837,644
4 Claims. (Cl. 137—621)

This invention relates to control valves having a piloted unloader valve. Particularly, it relates to a control valve in which the rate of fluid delivery to the controlled motor is controlled by valve position regardless of the back pressure in the motor, the back pressure being a function of the load operated upon by that motor.

For manipulative ease, it is desirable that in any given position of the valve the rate of movement of the load carried by the motor be the same, regardless of the size of the load. The rate can, of course, be varied by the graduating action of the valve, but this graduation in rate due to the graduating action of the valve is desirably the same whether a light or a heavy load is being moved. The advantage of this is that the valve operator knows that for any particular valve setting, the load will move at a certain rate and he need not take into consideration whether he is controlling movement of a heavy or a light load.

According to the present invention, the control valve is provided with a motor-operated unloader valve. The valve motor is biased in a valve-opening direction by the pressure existing in the supply chamber of the control valve, and in the valve-closing direction by a relatively light spring and the pressure in the motor chamber of the unloader valve. The motor chamber of the unloader valve is arranged so that it is connected, when the control valve is in its neutral position, with the sump, thus the unloader valve is open and the pump is unloaded. When the valve is in one of its motor-actuating positions, this motor chamber is connected in flow communication with the actuated controlled motor. The unloader valve motor includes a differential piston; the smaller area being subject to the pressure in the supply chamber and the larger area being subject to the back pressure in the actuated or controlled motor.

The unloader valve motor piston is thus subject to unbalanced pressures because of the pressure drop which the fluid undergoes in passing from the supply chamber of the valve to the motor port to which it is connected by the control valve. It is desired that this pressure drop be the same in all active positions of the valve regardless of load. The flow rate, of course, varies because the graduating action of the control valve varies the cross-sectional area of the flow path. The pressure drop is a function of both the valve's position and the flow rate but is independent of the back pressure in the motor port connected to receive pressure so long as the maximum pressure produced by the pump is not exceeded.

The invention will be described having reference to the accompanying drawings, in which.

The invention can be used on simple control valves as well as on multiple valves and the invention is not limited to use with the illustrated embodiment.

Figure 1:
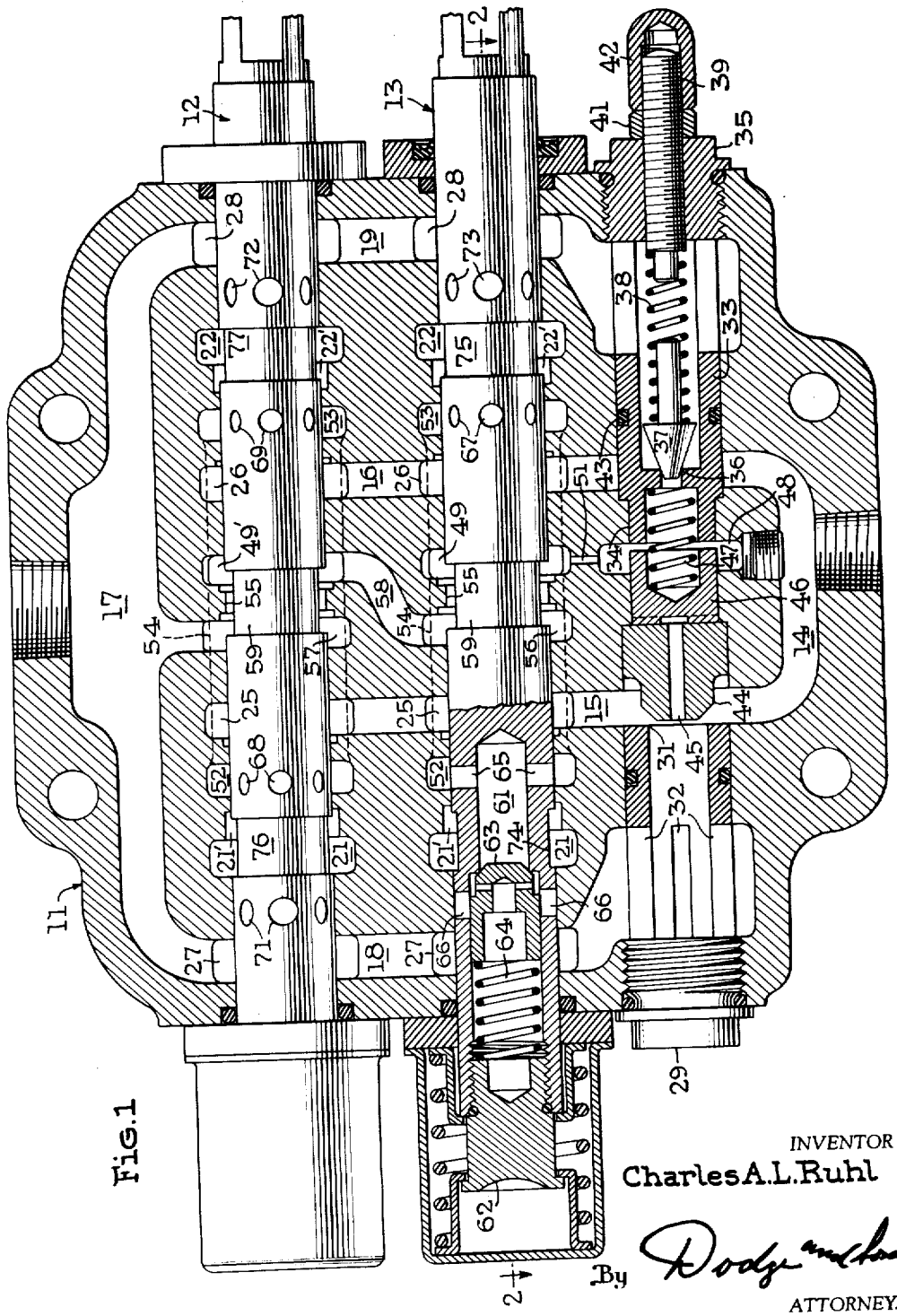
FIG. 1 is an axial section of a multiple valve embodying the present invention.

Referring first to FIG. 1, the valve body 11 is provided with two valve bores in which valve plungers 12 and 13 are shiftable. The valve housing is provided with a cored inlet passage 14 having branches 15 and 16 which intersect the valve bores. It is also provided with a cored outlet passage 17 having branches 18 and 19 which intersect the valve bores adjacent their outer ends. Each valve bore is encircled by annular motor chambers 21 and 22 with which the motor ports 23 and 24 communicate (see FIG. 2). The inlet branches 15 and 16 and the outlet branches 18 and 19 include annular chambers 25 and 26, and 27 and 28, respectively.

These branches 15, 16, 18 and 19 intersect a third bore in the housing. The end of this third bore, adjacent the branch 18, is closed by valve seat plug 29 which is counterbored, as shown, and has a valve seat 31 at its inner end; slots 32 being provided whereby fluid may flow from the counterbore into the branch 18. The other end of this third bore is closed by a relief valve assembly which includes a bushing 33, a portion of the outer diameter of which is reduced at 34 and which fits into a reduced diameter portion of the bore. This bushing 33 is retained in place by a plug 35. A valve seat 36 is formed in the interior of the bushing 33. A valve 37 is biased by spring 38 to seat on the valve seat 36. The stress in spring 38 is adjustable by means of an adjusting screw 39 attached to the plug 35 by screw threads and adapted to be locked by a lock nut 41. An acorn nut 42 is provided on the outer end of the adjusting screw 39 to discourage unauthorized adjustment. An O-ring 43 serves to prevent leakage between the branches 16 and 19.

An unloader valve 44 is arranged to coact with the valve seat 31. This valve includes a central axial passage 45. A valve follower 46 is provided in a reduced diameter portion of the third bore and is biased, by spring 47, into contact with the valve member 44. Valve 44 and follower 46 constitute a differential piston. The effective area of the valve subject to pump discharge pressure is the area of member 44 minus the area of the valve seat 31 and is less than the area of follower 46. An annular chamber 48 encircles the reduced diameter portion of this third bore and is in flow communication with an annular chamber 49 through a restriction 51. A manifold 54, associated with the lower valve bore, connects annular chamber 49 with a pair of similar chambers 52 and 53 (see FIG. 2). Another manifold 54 interconnects corresponding chambers 49', 52 and 53 in the upper valve bore. Adjacent each of the chambers 49 and 49', but separated therefrom by a land 55, are annular chambers 56 and 57. A cross-over passage 58 interconnects annular chambers 56 and 49'. Annular chamber 57 is connected to the outlet chamber 17, as shown.

Figure 2:
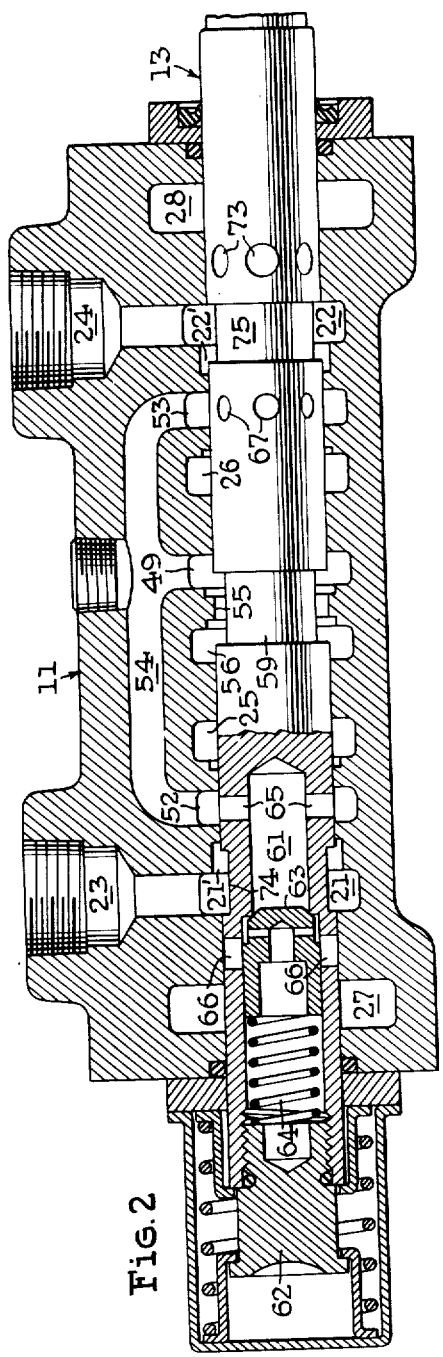
FIG. 2 is a section on the line 2—2 of FIG. 1.

The valve plungers 12 and 13 are shown, in FIGS. 1 and 2, in their neutral positions. Each is provided with a central encircling groove 59 which interconnects chambers 49 and 56, and 49' and 57, respectively. The left-hand end of the valve plunger 13 has been shown in section. It will be understood that its right-hand end and the right and left-hand ends of the valve plunger 12 are of the same construction. The valve is provided with a shouldered counterbore 61 closed at its outer end by a centering spring seat 62. A check valve 63 is biased by spring 64 to seat against the shoulder in counterbore 61. A set of radial passages 65 extend outward through the surface of the valve from the small diameter portion of the counterbore 61. A similar set of radial passages 66 extend through the walls of the plunger from the large diameter portion of the counterbore 61. The ports 67, 68 and 69 correspond to the ports 65 while the ports 71, 72 and 73 correspond to ports 66. The valve plunger 13 is encircled by shallow grooves 74 and 75. Groove 74 is located intermediate the ports 65 and 66, and the groove 75 is located intermediate the ports 67 and 73. Similar encircling grooves 76 and 77 are provided on the valve plunger 12. Motor ports 21 are provided with centrally-extending undercuts 21'. Similar centrally-extending undercuts 22' are provided in conjunction with motor ports 22.

The operation of the control valve is, generally speaking, conventional. Consider valve plunger 13. Speaking generally, as this plunger is shifted to the right, the radial ports 65 are placed in communication with the inlet branch 15 and the ports 66 are placed in communication with the motor chamber 21. Fluid will flow from the inlet branch 15, through the ports 65, through the counterbore 61, past check valve 63, out through the radial ports 66 to the motor chamber 21. At the same time, radial ports 67 will have been placed in registry with the annular motor groove 22, and fluid will flow from this groove through the ports 67, through the counterbore 61 and past the check valve therein, and outward through the radial ports 73 to the outlet branch 19. If the valve plunger 13 were shifted in the opposite direction, the motor chamber 22 would receive fluid from the inlet branch 16 and the motor chamber 21 would be connected to the outlet branch 18.

However, in a valve embodying the present invention, certain other flow passages are established, as an incident to shifting of the valve plunger, in addition to the already-mentioned flow paths established by the conventional type of control valve.

In the illustrated neutral position of the control valves 12 and 13 (FIGS. 1 and 2), it will be noticed that the annular chamber 48 is connected to the discharge chamber 17 by a flow path which includes, in series, the restriction 51, annular chamber 49, groove 59, annular chamber 56, cross-over passage 58, annular chamber 49', groove 59, and annular chamber 57. The pressure supplied to the supply chamber 14, by a pump (not shown), will act on valve 44 to overcome the bias of spring 47 and the pressure in chamber 48, thereby moving the unloader valve 44 to its illustrated position which unloads the pump. This unloading flow is substantially unrestricted because spring 47 is a relatively light spring.

Figure 3:
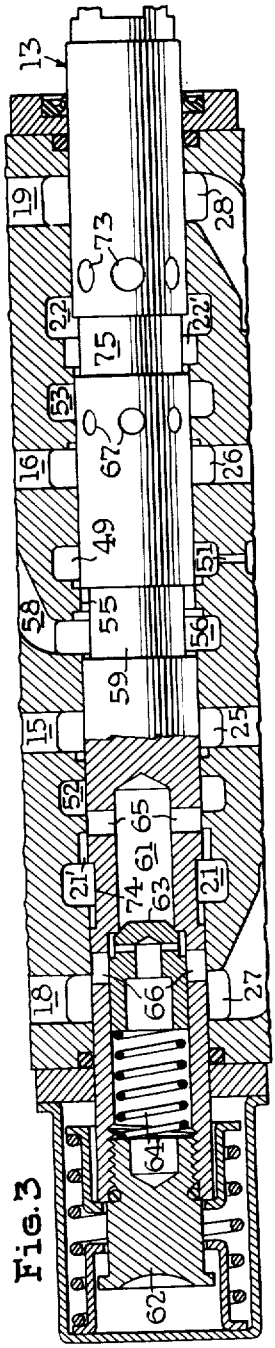
FIGS. 3 and 4 are sectional views similar to FIG. 1 but showing different operative positions of the control valve.

Let it be assumed that the valve plunger 13 is shifted slowly to the left. When it reaches the position shown in FIG. 3, flow from chamber 49 to chamber 56 will be cut off and motor port 21 will be connected to the branch 18 of the exhaust passage through undercut 21', ports 65, past check valve 63 and through ports 66'. Chamber 52 of manifold 54 is also connected to this exhaust branch 18 through the same flow path. Hence, chambers 48 and 49 remain at low pressure and the unloader valve is not closed.

Figure 4:
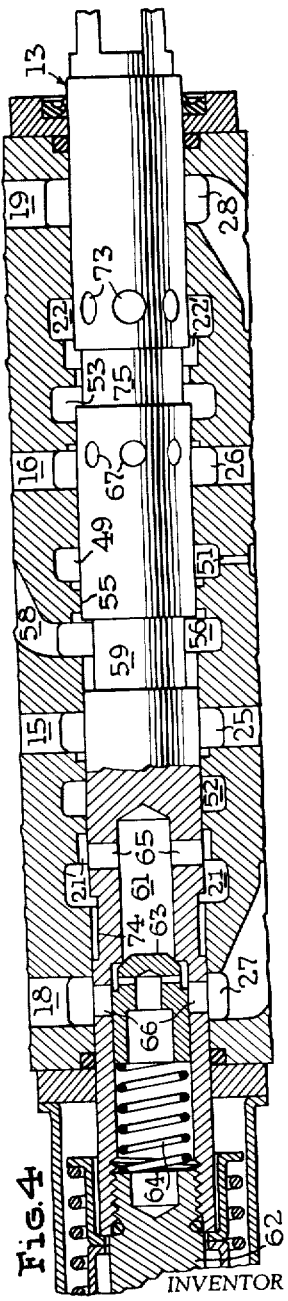

Slight additional movement will isolate chamber 52 from the ports 65 and thereafter cause groove 75 to interconnect annular chambers 53 and 22. Back pressure in motor chamber 22 is now transmitted to chamber 48 (via chamber 53, manifold 54 and chamber 49) where it acts upon valve follower 46 and causes it to move unloader valve 44 toward its seat 31. As a result, the pressure in inlet branches 15 and 16 rises. This pressure acts in opposition to the pressure in chamber 48, causing the unloader valve to assume an equilibrium position in which the force due to the pressure in chamber 48 plus the force of spring 47 will be balanced by the force in the inlet branch 15 acting on valve 44. Further movement of valve 13 to the left causes ports 67 and 73 to be connected with chambers 26 and 22, respectively (see FIG. 4), and thus provides a supply path to the motor.

If the motor load changes, the back pressure acting in chambers 53 and 48 changes and this causes the unloader valve to close further if the load increases or to open further if the load decreases. This movement of the unloader valve causes the inlet pressure to be modified, thus restoring the pressure drop.

The relief valve 37 is biased open by the pressure in chamber 48 and is effective to vent this chamber and thus permit opening of the unloading valve to reduce inlet pressure.

The same sequence of porting occurs when valve 13 is shifted to the right and no detailed description of it is necessary. The valve 13 is identical to valve 12 and performs the same function. Since the inlet and exhaust branches are each connected in parallel flow relation with the valve bores, the valves may be operated simultaneously in which case the inlet pressure will be determined by the pack pressure in the motor space supplied with pressure through valve 13 and the relief valve 37 will be subject to this back pressure.

What is claimed is:

1. An unloader valve for use in conjunction with a graduating supply and exhaust valve of the type having a controlled connection, a supply connection, and an exhaust connection, said valve being shiftable between a neutral position in which said controlled connection is blocked, a supply position in which the supply connection and the controlled connection communicate, and an exhaust position in which said controlled connection and said exhaust connection communicate, said unloader valve comprising means defining a flow path from the supply connection to the exhaust connection; a valve seat in the path; a valve yieldingly biased toward said seat; and two opposed motor means, having different effective areas, connected with said valve, the motor with the larger effective area being in flow communication through said supply and exhaust valve with the controlled connection when the supply and exhaust valve is in supply position, and in flow communication with the exhaust connection through said supply and exhaust valve when that valve is in its other positions and the motor means with the smaller effective area being connected to receive fluid from said supply connection.

2. Means to pilot the operation of an unloader valve for use in conjunction with a graduating control valve comprising in combination means defining a supply connection for said control valve; means defining an exhaust connection from said control valve; means defining an unloading path extending between said supply and exhaust connections; valve means yieldingly biased to close said unloading path; means defining at least one motor connection to be controlled by said control valve; differential piston motor means connected to actuate said valve means, the smaller area of said piston means being subject to the pressure in said supply connection and urging said valve means in an opening direction; and means defining a pilot passage communicating with the larger area of said piston means, the pressure therein urging said valve means closed, said control valve in its motor-actuating position serving to establish communication between said motor connection and said pilot passage and in neutral position to establish communication between said pilot passage and the exhaust connection.

3. In a graduating control valve of the type including a valve controlling flow between a motor connection, a supply connection and an exhaust connection, the improvement which comprises a passage interconnecting the supply and exhaust connections; a valve biased to close said passage; differential piston motor means connected to operate said valve; means, effective only in the supply position of the control valve, affording communication between said motor connection and that working space of said motor means in which the larger piston works; and means effective in all other positions of the control valve for connecting said working space to the exhaust connection, the smaller piston of the motor being subject to the pressure in said supply connection to urge the valve in its opening direction.

4. A three-position control valve having a neutral position and two motor-actuating positions, comprising a body having therein a valve seat bore; a valve plunger reciprocable in said bore, the bore having ten axially spaced annular grooves in its side wall; an exhaust manifold connecting the first, fifth, and tenth grooves; an inlet manifold connecting the fourth and seventh grooves; a pilot manifold connecting the third, sixth and eighth grooves, the second and ninth grooves being adapted for connection to controlled motor ports, said plunger having a central groove which in the neutral position interconnects the fifth and sixth grooves; means, including a valve seat, affording a flow connection between said supply and exhaust manifolds; valve means arranged to coact with said seat; a spring biasing said valve closed; differential piston motor means connected to operate said motor means, the smaller working space of said motor means being connected to receive fluid at inlet manifold pressure and urge said valve means away from said seat, and the larger working space being connected to receive fluid from said sixth groove and urge said valve toward its seat; grooves formed in said valve plunger, one serving to interconnect said second and third grooves in the first motor-actuating position and the other serving to interconnect said ninth and eighth grooves in the second motor-actuating position, said plunger blanking said eighth groove in said first motor-actuating position and blanking said third groove in said second motor-actuating position.

References Cited in the file of this patent

UNITED STATES PATENTS

| | | |
|---|---|---|
| 651,334 | Baker | June 12, 1900 |
| 1,916,433 | Muller | July 4, 1933 |
| 2,073,070 | Lewis | Mar. 9, 1937 |
| 2,503,870 | Harrington | Apr. 11, 1950 |
| 2,582,556 | Morey | Jan. 15, 1952 |

FOREIGN PATENTS

| | | |
|---|---|---|
| 512,426 | Great Britain | Sept. 15, 1939 |

UNITED STATES PATENT OFFICE
CERTIFICATE OF CORRECTION

Patent No. 2,994,346

August 1, 1961

Charles A. L. Ruhl

It is hereby certified that error appears in the above numbered patent requiring correction and that the said Letters Patent should read as corrected below.

Column 5, line 9, for "motor" read -- valve --.

Signed and sealed this 5th day of December 1961.

(SEAL)
Attest:

ERNEST W. SWIDER
Attesting Officer

DAVID L. LADD
Commissioner of Patents

USCOMM-DC